(12) United States Patent
Alonso Esteban et al.

(10) Patent No.: US 10,045,618 B2
(45) Date of Patent: Aug. 14, 2018

(54) HOT PLATE AND HOB COMPRISING A CORRESPONDING HOT PLATE

(75) Inventors: Rafael Alonso Esteban, Huesca (ES); Miguel Angel Bunuel Magdalena, Zaragoza (ES); Enrique Carretero Chamarro, Zaragoza (ES); Francisco Javier Ester Sola, Zaragoza (ES); Francisco Javier Pelayo Zueco, Zaragoza (ES); Pilar Perez Cabeza, Zaragoza (ES); Fernando Planas Layunta, Zaragoza (ES); Jesus Mario Subias Domingo, Zaragoza (ES); Francisco Villuendas Yuste, Zaragoza (ES); Ana Margarita López de Lama, legal representative, Zaragoza (ES)

(73) Assignee: BSH Hausgeräte GmbH, Munich (DE)

( * ) Notice: Subject to any disclaimer, the term of this patent is extended or adjusted under 35 U.S.C. 154(b) by 566 days.

(21) Appl. No.: 14/007,727

(22) PCT Filed: Mar. 9, 2012
(Under 37 CFR 1.47)

(86) PCT No.: PCT/IB2012/051106
§ 371 (c)(1),
(2), (4) Date: Dec. 2, 2013

(87) PCT Pub. No.: WO2012/131510
PCT Pub. Date: Oct. 4, 2012

(65) Prior Publication Data
US 2014/0076881 A1    Mar. 20, 2014

(30) Foreign Application Priority Data
Mar. 30, 2011   (ES) .................................. 201130483

(51) Int. Cl.
*A47B 77/08* (2006.01)
*C03C 17/36* (2006.01)
(Continued)

(52) U.S. Cl.
CPC .............. *A47B 77/08* (2013.01); *C03C 17/36* (2013.01); *C03C 17/3613* (2013.01);
(Continued)

(58) Field of Classification Search
CPC ..... A47B 77/08; C03C 17/36; C03C 17/3613; C03C 17/3648; C03C 17/3649
(Continued)

(56) References Cited

U.S. PATENT DOCUMENTS 4,996,105 A * 2/1991 Oyama .................. C03C 17/36
428/336
5,206,496 A * 4/1993 Clement ................ B29C 71/04
219/121.6
(Continued)

FOREIGN PATENT DOCUMENTS

GB    2126256 A    3/1984

OTHER PUBLICATIONS

International Search report PCT/IB2012/051106 dated Jul. 20, 2012.
National Search Report ES 201130483 dated Nov. 27, 2012.

*Primary Examiner* — David Angwin
*Assistant Examiner* — Justin Dodson
(74) *Attorney, Agent, or Firm* — Michael E. Tschupp; Andre Pallapies; Brandon G. Braun

(57) ABSTRACT

A hot plate includes a base plate having an underside. A coating has at least two metallic layers and at least two dielectric layers and is formed on the underside of the base
(Continued)

plate in such a way that a reflectivity of the hot plate is lower than 15% in a wavelength range between 380 nm and 780 nm.

36 Claims, 1 Drawing Sheet

(51) Int. Cl.
 *C03C 23/00* (2006.01)
 *H05B 3/74* (2006.01)
(52) U.S. Cl.
 CPC ...... *C03C 17/3649* (2013.01); *C03C 23/0025* (2013.01); *H05B 3/74* (2013.01)
(58) Field of Classification Search
 USPC .................. 219/443.1–468.2, 538, 552, 553
 See application file for complete search history.

(56) References Cited

U.S. PATENT DOCUMENTS

| | | | | |
|---|---|---|---|---|
| 5,902,505 | A * | 5/1999 | Finley | C03C 17/36 |
| | | | | 219/203 |
| 6,627,304 | B1 * | 9/2003 | Eisenkramer | G02B 5/22 |
| | | | | 428/216 |
| 7,718,929 | B2 * | 5/2010 | Shimatani | C03C 17/06 |
| | | | | 219/443.1 |
| 2007/0295711 | A1 * | 12/2007 | Striegler | C03C 8/18 |
| | | | | 219/448.11 |
| 2008/0190409 | A1 | 8/2008 | Demoi et al. | |
| 2008/0190912 | A1 * | 8/2008 | Yeung | H05B 3/265 |
| | | | | 219/443.1 |
| 2008/0264931 | A1 * | 10/2008 | Vilato | C03C 17/00 |
| | | | | 219/622 |
| 2009/0197097 | A1 * | 8/2009 | Medwick | B32B 17/06 |
| | | | | 428/432 |
| 2012/0125314 | A1 | 5/2012 | Alonso Esteban et al. | |

* cited by examiner

HOT PLATE AND HOB COMPRISING A CORRESPONDING HOT PLATE

BACKGROUND OF THE INVENTION

The invention relates to a hot plate with a base plate, whose underside embodies a coating with metallic layers and dielectric layers. The invention further relates to a cooktop with a corresponding hot plate.

Such embodiments of hot plates are known in a very wide variety of different models. An embodiment of this kind is known from U.S. Pat. No. 37,718,929 B2. There, however, the coating is subject to limitations, in that the number of layers, comprising a protective antioxidation layer and a light blocking layer is between 2 and 4. In the case of embodiments of this kind, the generation of optical effects is limited in relation to the overall optical impression of the hot plate.

BRIEF SUMMARY OF THE INVENTION

It is the object of the present invention to create a hot plate on whose underside is embodied a coating with a multiplicity of layers, and more diverse possibilities for optical effects are thereby enabled in relation to the color representation of the hot plate.

An inventive hot plate comprises a base plate, on whose underside is embodied a coating with metallic layers and dielectric layers. The coating is embodied with at least two metallic layers and at least two dielectric layers in such a way that reflectivity of the hot plate is <15% in the wavelength range between 380 nm and 780 nm. In an embodiment of this kind, a hot plate can be provided in a particularly advantageous and effective manner, whose overall optical impression appears as metallic black. This optical effect is achievable by means of the very specific embodiment of the coating, with the respective numbers of layers and their optical properties in terms of reflectivity.

The reflectivity of the hot plate in the wavelength range between 380 nm and <400 nm and between >530 nm and 780 nm is preferably <10%. The optical effect being aspired to in relation to the metallic black impression of the hot plate can thereby be still further improved.

It is preferably provided for the coating to be so embodied that a transmittance of the hot plate in the wavelength range between 380 nm and 780 nm is <12%, in particular between 0.5% and 10%.

It is preferably provided for the number of metallic layers to be 2 or 3.

It is in particular provided for the number of dielectric layers to be between 2 and 4.

It is in particular provided for the coating to have as its lower finish a protective layer, in particular a protective antioxidation layer.

Viewed from the underside downwards, the sequence of layers is in particular embodied initially starting with a dielectric layer, followed by a metallic layer, followed then in turn by a dielectric layer and then once again a metallic layer. Further dielectric and metallic layers may follow. The lower downward finish of the coating is then formed by the protective layer.

It is preferably provided for the metallic layers and the dielectric layers in each case to have layer thicknesses of <=100 nm.

It is in particular provided for at least two metallic layers of the coating to have different layer thicknesses and/or at least two dielectric layers of the coating to have different layer thicknesses. An extremely large range of different color designs can thereby be enabled, in a highly individual and also nuanced manner.

The layers of the coating are preferably embodied by means of sputtering on the underside, in particular by means of magnetron sputtering. It is preferably provided for the material to have a metallic layer SSt ("Stainless Steel"), Mo, Ni, Cr, Nd, V, Ti, Ta, Si, Al, W, Cu or a linkage of at least two of the cited elements.

As regards the material of a dielectric layer, it is preferably provided for that comprises $SnO_x$, $ZnO_x$, $TiO_x$, $AlO_x$, $SiO_x$, $NbO_x$, $TaO_x$, $SiN_x$, $AlN_x$, $TiN_x$ or a compound of at least two of the cited compounds.

It is preferably provided for the coating to comprise a first dielectric layer with $SnO_x$ with a layer thickness von 46 nm. In particular a first metallic layer is subsequently embodied on the bottom of this first dielectric layer with SSt as the material and with a layer thickness of 8 nm. A second dielectric layer using $SnO_x$ and with a layer thickness of 56 nm is in turn embodied on its bottom, on which a second metallic layer is subsequently embodied with SSt with a layer thickness of 33 nm. A third dielectric layer using $SnO_x$ with a layer thickness of 50 nm is then in turn embodied on this. This particularly specific version of the coating embodiment guarantees, in a particularly noteworthy manner, the metallic black optical effect of the hot plate.

In particular the base plate of the hot plate is embodied from glass or glass ceramic.

The coating under the base plate preferably has a layer thickness of between 10 nm and 500 nm auf.

It can also be provided for the base plate of the hot plate in addition to be printed. Here, imprints can be embodied on the front face or on the surface of the base plate. Furthermore, markings can be embodied in the base plate itself. These can, for example, be created by means of laser light. By means of imprints of this kind it is possible to indicate interface areas or operating fields. In addition, cooking zones too can be demarcated accordingly within their peripheral boundaries. Imprints can, for example, be effected by means of a silkscreen method or laser marking. By means of a laser it is also possible to embody corresponding markings at different height levels in the interior of the base plate. Further possibilities in this respect are specified in DE 10 2006 017 250 A1.

A downward embodied protective layer of the coating can also be created by means of a protective finish, which is for example embodied for example by means of a paint, polymer material or a ceramic material. Here too, the deposition can take place by means of imprint or using spray techniques. Imprints of this kind are preferably embodied with a thickness of several 100 pm.

In particular application of the layers of the coating by means of PVD (Physical Vapor Deposition) techniques enables the layer thicknesses of the individual layers to be created with great precision, and thereby also the visual optical effect in relation to the representation of display elements, lighting elements, such as for example LEDs, and images, to be recognizable through the coating. On the other hand, however, it can prevent mechanical elements and further actual components located thereunder being detectable when viewing the hot plate, when this hot plate is arranged in a cooktop.

By means of such an embodiment of a coating of the hot plate, with an additional imprint where applicable, it can also be achieved that a planar area, by means of which the operating apparatus on the hot plate is indicated, is represented with a uniform optical appearance.

The invention also relates to a cooktop with an inventive hot plate or an advantageous embodiment of this.

Further features of the invention are evident from the claims, the figures and the description of the figures. The features and combinations of features previously cited in the description and the features and combinations of features subsequently cited in the description of the figures and/or shown solely in the figures may be used not only in the respectively specified combination, but also in other combinations or in isolation, without departing from the scope of the invention.

BRIEF DESCRIPTION OF THE DRAWINGS

An exemplary embodiment of the invention is explained in greater detail below on the basis of diagrammatic drawings. Where.

DETAILED DESCRIPTION OF EXEMPLARY EMBODIMENTS OF THE PRESENT INVENTION

Figures 1, 2:
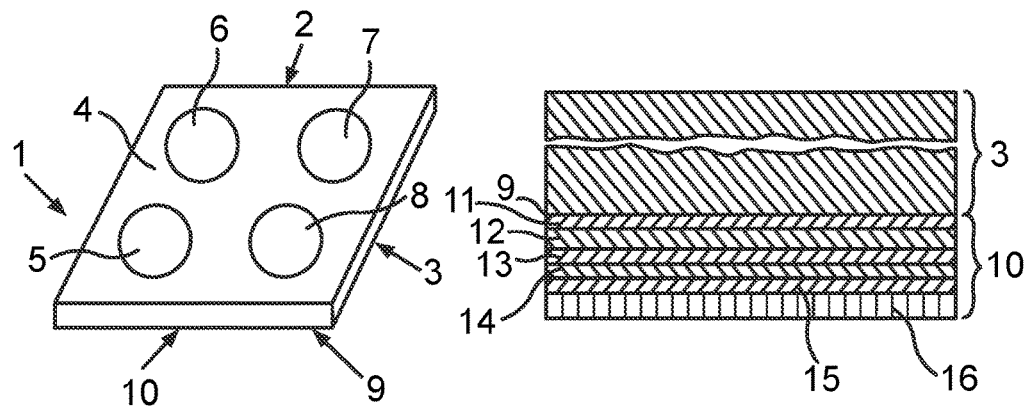
FIG. 1 shows a schematic perspective representation of an exemplary embodiment of an inventive cooktop.
FIG. 2 shows a schematic sectional representation through an exemplary embodiment of a hot plate of the cooktop according to FIG. 1.

In the figures, identical elements or those having the same function, are given the same reference characters.

FIG. 1 shows a schematic and perspective view of a cooktop 1, having a hot plate 2, which has a base plate 3, embodied in glass or glass ceramic. Indicated on a top surface 4 of the base plate 3, and shown by way of example in terms of number and position, are four cooking zones 5, 6, 7 and 8. On an underside 9 of the base plate 3 is embodied a coating 10, not shown in further detail in FIG. 1, which has at least two metallic layers and at least two dielectric layers, as well as a protective antioxidation layer.

FIG. 2 shows a sectional view through the hot plate 2 according to the representation in FIG. 1. The relative thicknesses are here not true to scale, and in particular the base plate 3 is significantly thicker than the entire layer thickness of the coating 10. In the embodiment shown it is provided for the coating 10 to have a first dielectric layer 11 directly abutting the underside 9. A first metallic layer 12 is subsequently embodied on the bottom of this. A second dielectric layer 13 is then in turn embodied on its bottom. A second metallic layer 14 is next embodied on this. On the bottom of this a third dielectric layer 15 is then embodied. This combination of layers is finished on the bottom by a protective layer, which takes the form of a protective anti-oxidation layer 16.

It can also be provided for further metallic layers and further dielectric layers to be provided.

In a specific embodiment it is provided for the coating 10 to have a first dielectric layer 11, the material of which takes the form of $SnO_x$. This first dielectric layer 11 has a layer thickness of 46 nm. Subsequently embodied on the bottom of the first dielectric layer is a first metallic layer 12, the material of which is SSt and whose layer thickness is 8 nm. The second dielectric layer 13 comprises as its material $SnO_x$ and has a layer thickness of 56 nm. On this is subsequently embodied a second metallic layer with the material SSt and a layer thickness of 33 nm. A third dielectric layer 15 using the material $SnO_x$ is then in turn embodied on its bottom, wherein this layer 15 has a layer thickness of 50 nm. The protective antioxidation layer 16 is then finally embodied on the bottom of this.

Figure 3:
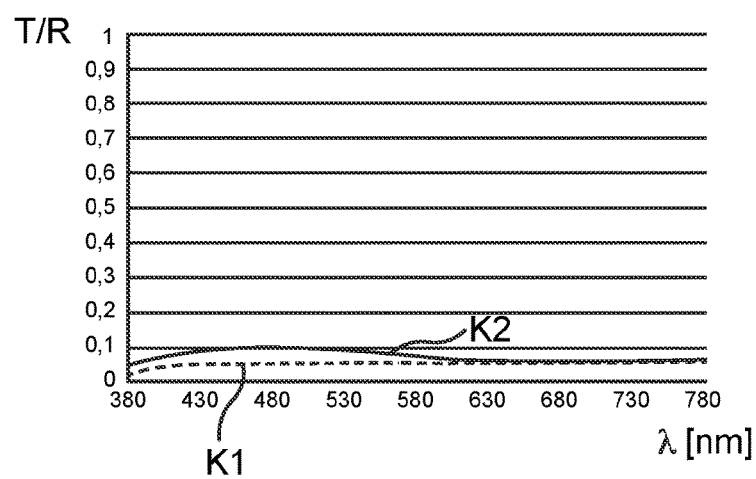
FIG. 3 shows a diagram, in which the transmittance T and the reflectivity R of the hot plate is shown, depending on the wavelength.

The representation according to FIG. 3 shows that the transmittance T according to curve K1 over the entire wavelength range from 380 nm to 780 nm is <10%, in particular <7%. In addition it can be seen according to the diagram in FIG. 3, that the reflectivity R according to curve K2 is likewise <15% and in particular is <11% over the entire wavelength range of 380 nm and 780 nm.

The invention claimed is:

1. A hot plate, comprising:
a base plate having an underside and a topside; and
a coating having at least two metallic layers and at least two dielectric layers and formed on the underside of the base plate in such a way that a reflectivity of the hot plate, of a light source located above the hot plate, is lower than 15%,
wherein the reflectivity is in a wavelength range between 380 nm and 780 nm,
the reflectivity is measured at the topside, and
the coating is uniform on the entire underside of the base plate.

2. The hot plate of claim 1, wherein
the reflectivity of the hot plate, in a wavelength range of between 380 nm and less than 400 nm, is less than 10%, and
the reflectivity of the hot plate, in a wavelength range of between greater than 530 nm and less than 780 nm, is less than 10%.

3. The hot plate of claim 1, wherein the coating is formed in such a way that a transmittance of the hot plate in the wavelength range between 380 nm and 780 nm is smaller than 12%.

4. The hot plate of claim 1, wherein the coating is formed in such a way that a transmittance of the hot plate in the wavelength range between 380 nm and 780 nm is between 0.5% and 10%.

5. The hot plate of claim 1, wherein the coating has a number of metallic layers which is 2 or 3.

6. The hot plate of claim 1, wherein the coating has a number of dielectric layers which is between 2 and 4.

7. The hot plate of claim 1, wherein the coating is embodied as a bottom finish with a protective layer.

8. The hot plate of claim 7, wherein the protective layer is a protective anti-oxidation layer.

9. The hot plate of claim 1, wherein the metallic layers and the dielectric layers respectively have layer thicknesses of less than 100 nm.

10. The hot plate of claim 1, wherein the at least two metal layers of the coating have different layer thicknesses or the at least two dielectric layers of the coating have different layer thicknesses.

11. The hot plate of claim 1, wherein the metal layers and the dielectric layers of the coating are formed by sputtering on the underside.

12. The hot plate of claim 11, wherein the sputtering includes magnetron sputtering.

13. The hot plate of claim 1, wherein one of the metal layers is made of a material selected from the group consisting of stainless steel, the elements Mo, Ni, Cr, Nb, V, Ti, Ta, W, Cu and a compound of at least two of stainless steel and the said elements.

14. The hot plate of claim 1, wherein a first one of the dielectric layers includes $SnO_x$ with a layer thickness of 46 nm, with the first dielectric layer being followed by at least a first one of the metal layers which includes SSt with a layer thickness of of 8 nm, followed by a second one of the dielectric layers includes $SnO_x$ with a layer thickness of 56 nm, followed by at least a second one of the metallic layers which includes SSt with a layer thickness of 33 nm, said coating having a third dielectric layer which includes $SnO_x$ with a layer thickness of 50 nm.

15. The hot plate of claim 1, wherein the coating has a layer thickness of between 10 nm and 500 nm.

16. The hot plate of claim 1, further comprising an imprint or an internal marking on the underside or the topside of the base plate.

17. The hot plate of claim 16, wherein the marking is created using laser light.

18. A cooktop, comprising a hot plate including a base plate having an underside and a topside, and a coating having at least two metallic layers and at least two dielectric layers and formed on the underside of the base plate in such a way that a reflectivity of the hot plate, of a light source located above the hot plate, is lower than 15%,
wherein the reflectivity is in a wavelength range between 380 nm and 780 nm,
the reflectivity is measured at the topside, and
the coating is uniform on the entire underside of the base plate.

19. The cooktop of claim 18, wherein
the reflectivity of the hot plate, in a wavelength range of between 380 nm and less than 400 nm, is less than 10%, and
the reflectivity of the hot plate, in a wavelength range of between greater than 530 nm and less than 780 nm, is less than 10%.

20. The cooktop of claim 18, wherein the coating is formed in such a way that a transmittance of the hot plate in the wavelength range between 380 nm and 780 nm is smaller than 12%.

21. The cooktop of claim 18, wherein the coating is formed in such a way that a transmittance of the hot plate in the wavelength range between 380 nm and 780 nm is between 0.5% and 10%.

22. The cooktop of claim 18, wherein the coating has a number of metallic layers which is 2 or 3.

23. The cooktop of claim 18, wherein the coating has a number of dielectric layers which is between 2 and 4.

24. The cooktop of claim 18, wherein the coating is embodied as a bottom finish with a protective layer.

25. The cooktop of claim 24, wherein the protective layer is a protective anti-oxidation layer.

26. The cooktop of claim 18, wherein the metallic layers and the dielectric layers respectively have layer thicknesses of less than 100 nm.

27. The cooktop of claim 18, wherein the at least two metal layers of the coating have different layer thicknesses or the at least two dielectric layers of the coating have different layer thicknesses.

28. The cooktop of claim 18, wherein the metal layers and the dielectric layers of the coating are formed by sputtering on the underside.

29. The cooktop of claim 11, wherein the sputtering includes magnetron sputtering.

30. The cooktop of claim 18, wherein one of the metal layers is made of a material selected from the group consisting of stainless steel, the elements Mo, Ni, Cr, Nb, V, Ti, Ta, W, Cu and a compound of at least two of stainless steel and the said elements.

31. The cooktop of claim 18, wherein a first one of the dielectric layers includes $SnO_x$ with a layer thickness of 46 nm, with the first dielectric layer being followed by at least a first one of the metal layers which includes SSt with a layer thickness of of 8 nm, followed by a second one of the dielectric layers which includes $SnO_x$ with a layer thickness of 56 nm, followed by at least a second one of the metallic layers which includes SSt with a layer thickness of 33 nm, said coating having a third dielectric layer which includes $SnO_x$ with a layer thickness of 50 nm.

32. The cooktop of claim 18, wherein the coating has a layer thickness of between 10 nm and 500 nm.

33. The cooktop of claim 18, wherein the hot plate has an imprint or an internal marking on the underside or the topside of the base plate.

34. The cooktop of claim 33, wherein the marking is created using laser light.

35. The hot plate of claim 1, wherein the at least two metallic layers and at least two dielectric layers are alternating such that one of the dielectric layers is located between two of the metallic layers and one of the metallic layers is located between two of the dielectric layers.

36. The cooktop of claim 18, wherein the at least two metallic layers and at least two dielectric layers are alternating such that one of the dielectric layers is located between two of the metallic layers and one of the metallic layers is located between two of the dielectric layers.

* * * * *